(12) United States Patent
Walther et al.

(10) Patent No.: US 12,065,578 B2
(45) Date of Patent: Aug. 20, 2024

(54) TWO-COMPONENT COATING COMPOSITIONS

(71) Applicant: SIKA TECHNOLOGY AG, Baar (CH)

(72) Inventors: Burkhard Walther, Oldenburg (DE); Heimo Woelfle, Traunstein (DE); Li Yi Chen, Shanghai (CN); Thierry Bubel, Neustadt a. d. Weinstraße (DE)

(73) Assignee: SIKA TECHNOLOGY AG, Baar (CH)

( * ) Notice: Subject to any disclaimer, the term of this patent is extended or adjusted under 35 U.S.C. 154(b) by 467 days.

(21) Appl. No.: 16/959,371

(22) PCT Filed: Jan. 7, 2019

(86) PCT No.: PCT/EP2019/050192
§ 371 (c)(1),
(2) Date: Jun. 30, 2020

(87) PCT Pub. No.: WO2019/137859
PCT Pub. Date: Jul. 18, 2019

(65) Prior Publication Data
US 2021/0062035 A1    Mar. 4, 2021

(30) Foreign Application Priority Data
Jan. 11, 2018 (EP) .................... 18151167

(51) Int. Cl.
| | | |
|---|---|---|
| C09D 175/08 | (2006.01) |
| C08G 18/18 | (2006.01) |
| C08G 18/24 | (2006.01) |
| C08G 18/30 | (2006.01) |
| C08G 18/32 | (2006.01) |
| C08G 18/48 | (2006.01) |
| C08G 18/66 | (2006.01) |
| C08G 18/73 | (2006.01) |
| C08G 18/76 | (2006.01) |
| C08K 3/22 | (2006.01) |
| C09D 7/61 | (2018.01) |

(52) U.S. Cl.
CPC ....... *C09D 175/08* (2013.01); *C08G 18/1808* (2013.01); *C08G 18/246* (2013.01); *C08G 18/3206* (2013.01); *C08G 18/4829* (2013.01); *C08G 18/6677* (2013.01); *C08G 18/73* (2013.01); *C08G 18/7671* (2013.01); *C08K 3/22* (2013.01); *C09D 7/61* (2018.01); *C08K 2003/2206* (2013.01)

(58) Field of Classification Search
None
See application file for complete search history.

(56) References Cited

U.S. PATENT DOCUMENTS

| | | | |
|---|---|---|---|
| 3,772,219 A | 11/1973 | Schwarz | |
| 4,501,873 A | 2/1985 | Werner | |
| 5,330,841 A * | 7/1994 | Gruber | C08G 18/8064 428/425.5 |

FOREIGN PATENT DOCUMENTS

| | | | |
|---|---|---|---|
| AU | 426554 B2 | 7/1972 | |
| CN | 102101970 A | 6/2011 | |
| CN | 102559126 A * | 7/2012 | |
| CN | 103739823 A * | 4/2014 | ......... C08G 18/4018 |
| CN | 107011784 A * | 8/2017 | |
| CN | 107011784 A | 8/2017 | |
| EP | 2208766 A2 | 7/2010 | |
| EP | 2944622 A1 | 11/2015 | |
| JP | 2015117299 A | 6/2015 | |

OTHER PUBLICATIONS

International Search Report for application No. PCT/EP2019/050192 dated Apr. 1, 2019, 4 pages.
International Written Opinion for application No. PCT/EP2019/050192 dated Apr. 1, 2019, 4 pages.

* cited by examiner

*Primary Examiner* — Randy P Gulakowski
*Assistant Examiner* — Ha S Nguyen
(74) *Attorney, Agent, or Firm* — Oliff PLC

(57) ABSTRACT

The present invention relates to a two-component coating composition comprising one first saturated polyhydroxy component, optionally one second saturated polyhydroxy component, wherein the second polyhydroxy compound is different from the first polyhydroxy compound, at least one metal component, water and at least one polyisocyanate. The resulting composition offers excellent scratch resistance, better mechanical properties and good applicability.

16 Claims, No Drawings

TWO-COMPONENT COATING COMPOSITIONS

CROSS REFERENCE TO RELATED APPLICATIONS

This application is a national stage application of International Application No. PCT/EP2019/050192, filed 7 Jan. 2019, which claims priority from European Patent Application No. 18151167.6, filed 11 Jan. 2018, both of which applications are incorporated herein by reference in their entireties.

The present invention relates to a two-component coating composition comprising one first saturated polyhydroxy component, optionally one second saturated polyhydroxy component, optionally further polyhydroxy components, wherein the one second polyhydroxy compound is different from the one first polyhydroxy compound, at least one polyisocyanate and at least one metal component. The resulting composition offers excellent scratch resistance, better mechanical properties and good applicability.

BACKGROUND OF THE INVENTION

Coatings are an important and rapidly growing value-added application. A coating often has a decorative and a protective function. Coating compositions for construction, in particular for flooring and waterproofing, are mostly based on epoxy resins or polyurethane resins.

An epoxy resin based coating composition provides aesthetically pleasing and glossy surfaces. On the other hand, an epoxy resin based flooring composition suffers from certain disadvantages. For example, undesired blushing effects may occur, especially at lower temperatures. Besides, the gloss intensity is often influenced by the temperature and may decrease in cold environments. Furthermore, the chemicals involved (i.e. epoxides and amines) are increasingly considered hazardous by European Union Regulation REACH, so that an alternative chemistry to overcome such limitations is desirable.

Polyurethanes (PUs) consist of polymers composed of a chain of organic units joined by carbamate (urethane/urea) links resulting from the reaction between a hydroxyl group or an amine group and an isocyanate group. Industrially, polyurethane polymers are usually formed by reacting an isocyanate with a polyol where both the isocyanate and the polyol contain on an average two or more functional groups per molecule. PUs can be produced in many different forms from very low-density foams to high performance composites and can thus be used in a multitude of applications. Examples of applications include flexible high-resilience foam seating, rigid foam insulation panels, electrical potting compounds, high performance adhesives, surface coatings, packaging, surface sealants and synthetic fibres.

All the material aspects that make PU into successful elastomers, adhesives, and thermoplastics translate to making high-performance coatings as well. Thus, PU coatings are valued particularly for durability, abrasion resistance, aesthetics, and formulation flexibility. In addition, like PU adhesives, PU coatings can be delivered in numerous formats to meet the process requirements of almost every operation.

Two-component polyurethane coatings, sometimes called two-package coatings or 2K polyurethane system, are probably the most commonly known of all the polyurethane coatings. Two-component describes a process in which there are two resin packages (often referred to as part A and part B) mixed immediately prior to the application. One package contains a resin with reactive chemical groups (e.g., hydroxyls or amines); the other package contains a polyisocyanate resin capable of reacting with the chemical groups. The key advantage of the two-component coating is the theoretically infinite storage stability coupled with rapid curing reaction once the two resins are mixed and a simple mixing process before application.

Two-component polyurethanes using sufficiently slow curing amines and three-component polyurethanes using water and a $CO_2$ scavenger are known for long time. However, three-component packages are not popular in the market and the amines used in the two-component polyurea compositions are comparably expensive and frequently hazardous to health.

U.S. Pat. No. 5,077,349 A discloses a process for the preparation of polyurethane plastics. This two-component composition based on the polyol polybutadiene resin is highly flexible and has low tensile strength.

The coating composition resulting from the above cited prior art is soft and hence does not offer the desired mechanical strength to the coatings.

It is common to add small quantities of calcium oxide to the one component and two component polyurethane systems to remove moisture from the polyols and other raw materials. Such use is described in U.S. Pat. No. 3,919,173. The purpose of the calcium oxide addition in these systems is to prevent water from creating unwanted side reactions, the water is thus considered a contaminant.

The use of metal oxides, hydroxides, ($CaO$, $Ca(OH)_2$), cement in combination with water, polyol and isocyanate is also well described, for example in EP 2944622. In these systems water is used to react with cyanate (NCO) in the system to form urea bonds offering benefits in physical properties and creating systems that are tolerant to moisture in application.

In order to obtain storage stability such systems use a powder component for the metal oxides, hydroxides, ($CaO$, $Ca(OH)_2$), cement in combination with two liquid components (Isocyanate+polyol, water), thus by design are three or more components.

Multi component compositions create complications in use often resulting in errors during application that result in premature failure of the coating or flooring. Multi component materials are also limited in their application procedure. For example, spray application is not possible with standard industry equipment.

Accordingly, it was an object of the presently claimed invention to provide two-component compositions which result in a coating composition with good mechanical properties, sufficient shelf life and pot life.

SUMMARY OF THE INVENTION

Surprisingly it was found that combination of polyisocyanates and water with certain polyhydroxy compounds provides sufficient shelf- and pot life with fast enough curing speed and good mechanical properties.

Thus, in one aspect the presently claimed invention is directed to a two-component composition comprising:
(I) Component A comprising
(i) one first saturated polyhydroxy compound selected from the group consisting of polyether polyol, polyester polyol, $C_2$ to $C_{32}$ alkyl polyol and sugar alcohol;

(ii) optionally one second saturated polyhydroxy compound selected from the group consisting of polyether polyol, polyester polyol, $C_2$ to $C_{32}$ alkyl polyol and sugar alcohol;

wherein the second polyhydroxy compound is different from the first polyhydroxy compound (iii) water;

(iv) at least one metal component selected from the group consisting of metal oxide, metal hydroxide, metal aluminate and metal silicate; and (II) Component B comprising at least one polyisocyanate.

The weight ratio of component (A) to component (B) is in the range of 1:20 to 3:1.

By 'a two-component' composition it is meant a composition comprising two essential components. Such a composition may additionally comprise one or more other optional components.

Compound names starting with 'poly' designate substances, which formally contain per molecule, two or more of the functional groups. The compound itself can be monomeric, oligomeric or polymeric compound. For instance, a polyol is a compound having two or more hydroxy groups, a polyisocyanate is a compound having two or more isocyanate groups.

The term 'average functionality' denotes the average number of functional groups on a given molecule.

"$M_w$" represents the weight average molecular weight and is determined according to DIN 55672-1 and referred to polystyrene calibration standard.

'% by weight' as used in the present invention is with respect to the total weight of the two-component composition.

The term 'saturated' denotes that the polyhydroxy compound has only single bonds between carbon atoms.

The term 'oligomer' denotes a molecule that consists of 2-10 monomers but do not have necessarily a molecular mass distribution.

The term 'prepolymer' refers to a monomer or system of monomers that have been reacted to an intermediate molecular mass state. This material is capable of further polymerization by reactive groups to a fully cured high molecular weight state.

DETAILED DESCRIPTION OF THE INVENTION

Before the present compositions and formulations of the invention are described, it is to be understood that this invention is not limited to particular compositions and formulations described, since such compositions and formulation may, of course, vary. It is also to be understood that the terminology used herein is not intended to be limiting, since the scope of the present invention will be limited only by the appended claims.

If hereinafter a group is defined to comprise at least a certain number of embodiments, this is meant to also encompass a group which preferably consists of these embodiments only. Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)" "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to a person skilled in the art from this disclosure, in one or more embodiments. Further-more, while some embodiments described herein include some, but not other features included in other embodiments, combinations of features of different embodiments are meant to be within the scope of the invention, and form different embodiments, as would be understood by those in the art. For example, in the appended claims, any of the claimed embodiments can be used in any combination.

(a) Polyhydroxy Compounds

The polyhydroxy compounds of the present invention comprise one first polyhydroxy compound and optionally one second polyhydroxy compound. The second polyhydroxy compound, when present in the composition, is different from the first polyhydroxy compound. If necessary, further polyhydroxy components might be used.

The one first polyhydroxy compound and the one second polyhydroxy compound, of the present invention is a saturated or (partly) aromatic polyhydroxy compound.

Preferably, the one first polyhydroxy compound and the one second polyhydroxy compound of the present invention is a non-alkaline saponifiable polyhydroxy compound and thus resistant to alkaline hydrolysis.

The inventively claimed two-component coating composition does preferably not contain any unsaturated polyolefin polyol, such as polybutadiene polyols and polyisoprene polyols, more preferably the inventively claimed two-component coating composition does not contain any polybutadiene diol.

The one first polyhydroxy compound of the present invention has at least two hydroxyl groups and a hydroxyl group content in the range of ≥0.5 wt.-% to ≤15 wt.-%, preferably ≥3 wt. % to ≤10 wt. %, by weight of the polyhydroxy compounds.

The one first polyhydroxy compound of the present invention is selected from the group consisting of polyether polyol, polyester polyol, $C_2$ to $C_{56}$ alkyl polyol and sugar alcohol.

In a preferred embodiment, the one first polyhydroxy compound of the present invention is selected from the group consisting of polyether polyol and polyester polyol.

In an embodiment, the one first polyhydroxy compound is a polyether polyol.

The polyether polyols are obtained by known methods, such as but not limited to, anionic polymerization of alkylene oxides with addition of at least one starter molecule which comprises from 2 to 8, preferably from 2 to 6, reactive hydrogen atoms in bound form in the presence of catalysts. As catalysts, it is possible to use alkali metal hydroxides such as, but not limited to, sodium or potassium hydroxide or alkali metal alkoxides, such as but not limited to, sodium methoxide, sodium or potassium ethoxide or potassium isopropoxide or, in the case of cationic polymerization, Lewis acids such as antimony pentachloride, boron trifluoride etherate or bleaching earth catalysts. Furthermore, double metal cyanide (or DMC) compounds can also be used as catalysts, as already described hereinabove.

Suitable polyether polyol includes products obtained by the polymerization of a alkylene oxides, such as ethylene oxide, propylene oxide, butylene oxide, and tetrahydrofuran in the presence of a starter molecule. Suitable starter molecule includes a plurality of active hydrogen atoms, and include, but are not limited to, water, butanediol, ethylene glycol, propylene glycol, diethylene glycol, triethylene glycol, dipropylene glycol, bisphenol-A or -F, ethanolamine, diethanolamine, triethanolamine, toluene diamine, diethyl toluene diamine, phenyl diamine, diphenylmethane diamine, ethylene diamine and cyclohexane diamine.

Examples of the polyether polyol include, but are not limited to, polyethyleneoxide polyol and polypropyleneoxide polyol, in particular polyethyleneoxide diol, polypropyleneoxide diol, polyethyleneoxide triol and polypropyleneoxide triol. Such polyether polyols are known to the person skilled in the art and therefore, the present invention is not limited by the choice of such polyols. Moreover, commercially available polyether polyol such as, but not limited to, Arcol® from Covestro may also be used for the purpose of the present invention.

Further examples of polyether polyol are, ethylene oxide-terminated ("EO-endcapped", ethylene oxide-end-capped) polypropylenoxide polyols, styrene-acrylonitrile-grafted polyetherpolyols, e.g. Lupranol® from BASF SE, Voranol™ polyols, Voralux™ polyols, Specflex™ polyols from Dow Chemicals and Desmophen® from Covestro.

Other suitable examples of polyether polyol are derived from the monomers consisting of ethylene oxide, propylene oxide, butylene oxide, tetrahydrofuran (hereinafter referred to as THF) and a mixture thereof. By the term "derived", as used herein, refers to the building block of the polyether polyol.

In an embodiment, the polyether polyol is derived from the monomer of THF. Commercially available polyether polyols such as, but not limited to, PolyTHF® from BASF SE may also be used for the purpose of the present invention.

Preferably the polyether polyol has a hydroxyl value in the range of ≥30 to ≤600 mg KOH/g, more preferably in the range of ≥30 to ≤500 mg KOH/g and most preferably in the range of ≥30 to ≤450 mg KOH/g determined according to DIN 53240.

Preferably the polyether polyol has a functionality in the range of ≥1.7 to ≤6, more preferably in the range of ≥1.5 to ≤4 and most preferably in the range of ≥1.5 to ≤3.5.

In another embodiment, the one first polyhydroxy compound is a polyester polyol.

Preferably the polyester polyol has a hydroxyl value in the range of ≥30 to ≤600 mg KOH/g, more preferably in the range of ≥30 to ≤500 mg KOH/g and most preferably in the range of ≥30 to ≤450 mg KOH/g determined according to DIN 53240.

Preferably the polyester polyol has a functionality in the range of ≥2 to ≤6, more preferably in the range of ≥2 to ≤5 and most preferably in the range of ≥2 to ≤4.

Polyester polyol as suitable polyhydroxy compound for the present invention comprise of at least one carboxylic acid and at least one $C_2$ to $C_{10}$ alkyl polyol. The term 'carboxylic acid' refers to saturated and/or unsaturated polycarboxylic acid such as dicarboxylic acid. The at least one carboxylic acid may contain additional functional groups such as, but not limited to hydroxyl groups.

The at least one dicarboxylic acid is preferably an aliphatic dicarboxylic acid of the general formula HOOC—$(CH_2)_y$—COOH, where y is a real number from 2 to 20, examples being succinic acid, adipic acid, glutaric acid, succinic acid, pimelic acid, suberic acid, azelaic acid, sebacic acid, heptane dicarboxylic acid, octane dicarboxylic acid, nonane dicarboxylic acid, decane dicarboxylic acid, undecane dicarboxylic acid and dodecane dicarboxylic acid. The dicarboxylic acids can be used individually or as mixtures, e.g. in the form of a mixture of succinic acid, glutaric acid and adipic acid. To prepare the polyester polyols, it may be advantageous to use the corresponding dicarboxylic acid derivatives such as dicarboxylic esters having from 1 to 4 carbon atoms in the alcohol radical, dicarboxylic anhydrides or dicarboxylic acid chlorides in place of the dicarboxylic acids.

Preferably at least one $C_2$ to $C_{10}$ alkyl polyol is selected from the group consisting of ethanediol, 1,3-propanediol, 1,4-butanediol, 1,5-pentanediol, 1,6-hexanediol, 1,10-decanediol, 2,2-dimethyl-1,3-propanediol, 2-methyl-1,3-propanediol, 1,2-propanediol, 3-methyl-1,5-pentanediol, dialkylene ether glycols such as diethylene glycol and dipropylene glycol, 2,2-bis(hydroxymethyl)1,3-propanediol and trimethylolpropane.

In a preferred embodiment, the one first saturated polyhydroxy compound is selected from the group consisting of polyethylene glycol, polypropylene glycol and polypropylenoxide triol.

In a preferred embodiment, the one second saturated polyhydroxy compound is selected from the group consisting of $C_2$ to $C_{56}$ alkyl polyol and sugar alcohol.

In another embodiment, the one second polyhydroxy compound is preferably a $C_2$ to $C_{32}$ alkyl polyol, more preferably a $C_2$ to $C_{12}$ alkyl polyol, particularly preferably a $C_2$ to $C_6$ alkyl polyol.

The term "$C_2$ to $C_{56}$ alkyl polyol" refers to a linear or branched, cyclic or acyclic, saturated aliphatic residues that are substituted by at least two, preferably two, three, four or five, hydroxy groups.

Examples of $C_2$ to $C_{32}$ alkyl polyols are ethanediol, propanediol, neopentylglycol, butanediol, pentanediol, diethylene glycol, triethylene glycol, dipropylene glycol, tripropylene glycol, cyclohexanedimethanol, trimethylol propane, glycerol, trimethylolethane, pentaerithrytol, hexanediol, heptanediol, octanediol, nonanediol, decanediol, undecanediol, dodecanediol, tridecanediol, tetradecanediol, pentadecanediol, hexadecanediol, heptadecanediol, octadecanediol, nonadecanediol, eicosanediol, heneicosanediol, docosanediol, tetracosanediol, hexacosanediol, heptacosanediol, octacosanediol, nonacosanediol, triacontanediol, dotriacontanediol and isomers thereof.

Examples of preferred $C_2$ to $C_{12}$ alkyl polyols are ethanediol, propanediol, neopentylglycol, butanediol, pentanediol, diethylene glycol, triethylene glycol, dipropylene glycol, tripropylene glycol, cyclohexanedimethanol, trimethylol propane, glycerol, trimethylolethane, pentaerithrytol, hexanediol, heptanediol, octanediol, nonanediol, decanediol, undecanediol, dodecanediol and isomers thereof.

More preferred $C_2$ to $C_6$ alkyl polyols are ethanediol, propanediol, neopentylglycol, butanediol, pentanediol, diethylene glycol, triethylene glycol, dipropylene glycol, tripropylene glycol, cyclohexanedimethanol, trimethylol propane, glycerol, trimethylolethane, pentaerithrytol, hexanediol and isomers thereof.

In another embodiment, the one second polyhydroxy compound is a sugar alcohol.

The term 'sugar alcohol' refers to alcohols derived from sugars. Sugar alcohols have the general formula $HOCH_2(CHOH)_n CH_2OH$, wherein n is a real number in the range of $\geq 2$ to $\leq 10$.

Suitable examples of sugar alcohols include but are not limited to xylitol, lactitol, erythritol, mannitol, sorbitol, galactitol and maltitol.

In a more preferred embodiment, the one second polyhydroxy compound is selected from the group consisting of propanediol, butanediol, glycerol, pentaerythritol and sorbitol.

Preferably, the one first polyhydroxy compound has a weight average molecular weight $M_w$ in the range of $\geq 100$ to $\leq 20,000$ g/mol, preferably in the range of $\geq 150$ to $\leq 15,000$ g/mol, more preferably in the range of $\geq 200$ to $\leq 10,000$ g/mol, still more preferably in the range of $\geq 200$ to $\leq 8,000$ g/mol and most preferably in the range of $\geq 200$ to $\leq 6,000$ g/mol determined according to DIN 55672-1.

Preferably, the one second polyhydroxy compound has a weight average molecular weight $M_w$ in the range of $\geq 50$ to $\leq 2,000$ g/mol, preferably in the range of $\geq 50$ to $\leq 1,500$ g/mol, still more preferably in the range of $\geq 50$ to $\leq 1,000$ g/mol and most preferably in the range of $\geq 50$ to $\leq 500$ g/mol determined according to DIN 55672-1.

In a preferred embodiment, the amount of the one first saturated polyhydroxy compound is in the range of $\geq 5.0$ wt. % to $\leq 40$ wt. %, based on the total weight of the two-component composition.

In a preferred embodiment, the amount of the one second saturated polyhydroxy compound, is in the range of $\geq 0.2$ wt. % to $\leq 20$ wt. %, based on the total weight of the two-component composition.

The first and the second polyhydroxy compound can be in any state. The term 'state' refers to the physical form of polyhydroxy compound. Preferably the first and the second polyhydroxy compound is in a liquid state.

(b) Water

In addition to the water which is present in the polyhydroxy compound, additional amount of water is added to the composition of the presently claimed invention, such that the amount of water present in the two-component coating composition is in the range of $\geq 1$ wt. % to $\leq 50$ wt. %, preferably in the range of $\geq 5$ wt. % to $\leq 40$ wt. %, more preferably in the range of $\geq 10$ wt. % to $\leq 40$ wt. %, based on the total weight of the two-component composition.

(c) Metal Component

Component A comprises at least one metal component selected from the group consisting of metal oxide, metal hydroxide, metal aluminate and metal silicate and mixtures thereof.

In an embodiment, the at least one metal component is selected from the group consisting of metal oxides and metal hydroxides.

In a preferred embodiment, the metal oxides and the metal hydroxides are based on the oxides and hydroxides of elements of group I B, II A, II B, VI B, VII B, preferably group II A.

"Group" herein denotes the group of the periodic table.

In a preferred embodiment, the at least one metal oxide and/or the at least one metal hydroxide is selected from the group consisting of magnesium oxide, magnesium hydroxide, calcium oxide and calcium hydroxide, more preferably calcium hydroxide and calcium oxide and most preferably calcium hydroxide.

The presence of a calcium compound selected from calcium hydroxide and/or calcium oxide prevents the formation of bubbles or blisters on the cured product's surface by quenching the $CO_2$ which is generated by the reaction of the isocyanate compounds and water that is present in the one first polyhydroxy compound.

The at least one metal oxide present in the two-component coating composition needs to be stabilized or else it sediments as a nonredispersible mass within few days' time. The use of $C_2$ to $C_6$ alkyl polyols stabilizes the metal oxide and prevents its sedimentation even after storage for long period of time.

In another preferred embodiment, the amount of the at least one metal oxide and/or the at least one metal hydroxide is in the range of $\geq 2$ wt. % to $\leq 50$ wt. %, preferably in the range of $\geq 5$ wt. % to $\leq 40$ wt. %, more preferably in the range of $\geq 10$ wt. % to $\leq 40$ wt. %, based on the total weight of the two-component composition.

(d) Polyisocyanates

For the purpose of the present invention, at least one polyisocyanate includes aliphatic polyisocyanate, cycloaliphatic polyisocyanate, aromatic polyisocyanate, modified polyisocyanate containing for example uretonimine groups, allophanate groups, isocyanurate groups, urethane groups and biuret groups.

In an embodiment, the at least one polyisocyanate is at least one diisocyanate of the abovementioned aliphatic polyisocyanate, cycloaliphatic polyisocyanate, aromatic polyisocyanate and modified polyisocyanate. Representative examples of these preferred diisocyanates may be found, for example, from U.S. Pat. Nos. 4,385,133, 4,522,975 and 5,167,899.

Suitable cycloaliphatic polyisocyanates include those in which two or more of the isocyanato groups are attached directly and/or indirectly to the cycloaliphatic ring. Aromatic polyisocyanates include those in which two or more of the isocyanato groups are attached directly and/or indirectly to the aromatic ring.

In an embodiment, the aliphatic polyisocyanates and cycloaliphatic polyisocyanates can comprise 6 to 100 carbon atoms linked in a straight chain or cyclized and having two isocyanate reactive end groups.

In an embodiment, the at least one polyisocyanate is selected from the group consisting of pentamethylene diisocyanate, hexamethylene diisocyanate (HDI), Isophorone diisocyanate (IPDI), 2,2,4- and 2,4,4-trimethyl-1,6-hexamethylene diisocyanate, tetramethoxybutane 1,4-diisocyanate, butane-1,4-diisocyanate, dicyclohexylmethane diisocyanate, cyclohexane 1,3-and 1,4-diisocyanate, 1,12-dodecamethylene diisocyanate, diisocyanates of dimeric fatty acids; lysine methyl ester diisocyanate, 1-isocyanato- 3,3,5-trimethyl-5-isocyanatomethylcyclohexane, hydrogenated diphenylmethane diisocyanate (H12MDI), hydrogenated 2,4-tolylene diisocyanate, hydrogenated 2,6-tolylene diisocyanate, methylene diphenyl diisocyanate (MDI), 2,4-toluene diisocyanate (2,4-TDI), 2,6-toluene diisocyanate (2,6-TDI), naphthalene diisocyanate (NDI), tetramethylxylylene diisocyanate (TMXDI), p-xylylene diisocyanate, and mixtures of these compounds, polymeric methylene diphenyl diisocyanate, carbodiimide-modified methylene diphenyl diisocyanate, tris-(isocyanatohexyl)-isocyanurate and mixtures with the higher homologues thereof, tris-(isocyanatohexyl)-biuret or mixtures with the higher homologues.

Methylene diphenyl diisocyanate (MDI) is available in three different isomeric forms, namely 2,2'-methylene diphenyl diisocyanate (2,2'-MDI), 2,4'-methylene diphenyl diisocyanate (2,4'-MDI) and 4,4'-methylene diphenyl diisocyanate (4,4'-MDI). MDI can be classified into monomeric MDI (also designated MMDI) and polymeric MDI (PMDI) referred to as technical MDI. For the present invention, polymeric MDI is the preferred one. Polymeric MDI includes oligomeric species and MDI isomers. Thus, polymeric MDI may contain a single MDI isomer or isomer mixtures of two or three MDI isomers, the balance being oligomeric species. Polymeric MDI tends to have isocyanate functionalities of higher than 2. The isomeric ratio as well as the amount of oligomeric species can vary in wide ranges in these products. For instance, polymeric MDI may typically contain about 30 to 80 wt. % of MDI isomers, the balance being said oligomeric species. The MDI isomers are often a mixture of 4,4'-MDI, 2,4'-MDI and very low levels of 2,2'-MDI.

Preferably, the at least one polyisocyanate is selected from the group consisting of oligomers and/or prepolymers of hexamethylene diisocyanate (HDI), methylene diphenyl diisocyanate (MDI) or a derivative of MDI such as polymeric methylene diphenyl diisocyanate, carbodiimide-modified methylene diphenyl diisocyanate.

Polymeric methylene diphenyl diisocyanate and carbodiimide-modified methylene diphenyl diisocyanate are commercially available, for e.g. Lupranat® M, Lupranat® MI and Lupranat® MM from BASF SE or Desmodur MDI-types from Covestro and polyisocyanate resin based on hexamethylene diisocyanate (HDI) is commercially available, for e.g. Desmodur N Types® from Covestro, Tolonate™ X Flo from Vencorex.

The polyisocyanate can be in any state. The term 'state' refers to the physical form of the polyisocyanate. Preferably the polyisocyanate is in a liquid state.

In a preferred embodiment, the at least one polyisocyanate is present in an amount in the range of ≥10 wt. % to ≤90 wt. %, preferably in the range of ≥20 wt. % to ≤90 wt. %, more preferably in the range of ≥20 wt. % to ≤80 wt. %, most preferably in the range of ≥30 wt. % to ≤80 wt. %, based on the total weight of the two-component composition.

(e) Catalyst

The two-component composition of the present invention further may comprise one catalyst or several catalysts.

In an embodiment, if present, the at least one catalyst is selected from the group consisting of amine catalysts, alkanolamine catalysts and metal catalysts.

In a preferred embodiment, the amine catalyst is a tertiary aliphatic amine catalyst.

In another preferred embodiment the tertiary aliphatic amine catalyst is selected from the group consisting of triethylenediamine, pentamethyldiethylenetriamine, dimethylcyclohexylamine, 2,2'-dimorpholinodiethyl ether, 2-(2-dimethyl-aminoethoxy) ethanol, 2-dimethylaminoethyl 3-dimethyl aminopropyl ether, bis(2-dimethylaminoethyl)ether, N,N-dimethylpiperazine, N-(2-hydroxyethoxyethyl)-2-azanorboranes, Jeffcat™, N,N,N,N-tetramethylbutane-1,3-diamine, N,N,N,N-tetra-methylpropane-1,3-diamine and N,N,N,N-tetramethylhexane-1,6-diamine, preferably 2,2'-dimorpholinodiethylether.

In another embodiment, the alkanolamine catalyst is selected from the group consisting of dimethylethanolamine, triethanolamine and mixture thereof.

In a preferred embodiment, the metal catalyst is selected from the group consisting of mercury, lead, tin, bismuth, potassium, lithium, titanium, zirconium and zinc catalyst and mixture thereof.

In another preferred embodiment, the metal catalyst is selected from the group consisting of dibutyltin dilaurate (DBTL), stannous octoate, potassium octoate, bismuth neo-decanoate and zinc neodecanoate and mixtures thereof.

In a preferred embodiment, the amount of the at least one catalyst is in the range of ≥0.05 wt. % to ≤5.0 wt. %, preferably in the range of ≥0.5 wt. % to ≤5.0 wt. %, based on the total weight of the two-component composition.

(i) Additive

The two-component composition of the invention further comprises at least one additive. The person skilled in the art is well aware of these additives and any further additives that may be added to obtain the polyurethane composition as described hereinabove.

If present, the at least one additive is selected from the group consisting of emulsifying agents, flame retardants, antimicrobial agents, pigments, defoamers, stabilizers, plasticizers, diluents, wetting and dispersing agents and fillers.

Emulsifying Agent

The emulsifying agent or an emulsifying polyol is selected from the group consisting of non-ionic surfactants and cationic surfactants.

Preferably the non-ionic surfactant is an ethoxylated alkyl polyether. Suitable emulsifying agent are available for example Lutensol® from BASF SE.

Flame Retardant

Suitable flame retardants include, for example, tricresyl phosphate, tris(2-chloroethyl) phosphate, tris(2-chloropropyl) phosphate, tris(1,3-dichloropropyl) phosphate, tris(2,3-dibromo¬propyl) phosphate and tetrakis(2-chloroethyl) ethylene diphosphate.

Apart from the aforementioned halogen-substituted phosphates, it is also possible to use inorganic flame retardants such as red phosphorus, aluminium oxide hydrate, antimony trioxide, arsenic trioxide, ammonium polyphosphate and calcium sulfate or cyanuric acid derivatives, e.g., melamine, or mixtures of two or more flame retardants, e.g., ammonium phosphates and melamine, and also optionally starch and/or expandable graphite to confer flame retardancy on the polyurethane prepared according to the present invention.

Antimicrobial Agent

Antimicrobials agents such as biocides, bactericides and fungistats are used as additives. Representative examples are N-trichloromethylthio phthalimide, 10,10'-Oxybisphenoxarsine, and 2-N-Octyl-6-isothiazoline.

Pigment

The term "pigment" should be understood as meaning white or coloured, mineral or organic particle which is intended to colour and/or opacify the composition containing it.

The pigment may be white or coloured, and mineral and/or organic. Suitable mineral pigments include, but are not restricted to, titanium oxide, titanium dioxide, zirconium oxide, zirconium dioxide, cerium oxide, cerium dioxide, zinc oxide, iron oxide, chromium oxide, ferric blue, manganese violet, ultramarine blue and chromium hydrate, and mixtures thereof.

Examples of commercially available pigments are Bayferrox® from Lanxess, Germany and Heucosin® from Heubach.

Stabilizer

Stabilizers for the purposes of the present invention are additives to protect polyurethanes from harmful environmental influences. Examples are primary and secondary antioxidants, hindered amine light stabilizers, UV absorbers, hydrolysis control agents and quenchers.

An example of a primary antioxidant is Irganox® from BASF. It suppresses the formation of free radical species and hydroperoxides in polyols both during storage and conversion.

The UV absorbers protect the polyurethanes from UV light-induced oxidation. An example of UV absorber is Tinuvin®, from BASF.

An example of hindered amine light stabilizers is Chimassorb® from BASF.

Examples of commercial stabilizers are provided in Plastics Additive Handbook, 5th Edition, H. Zweifel, ed., Hanser Publishers, Munich, 2001 ([1]), p.98 S136.

Suitable stabilizers are silane compounds such as Cycloquart® from BASF.

Plasticizer

Preferably additives are one or more plasticizers, such as phenyl alkanesulfonates, dialkyl phthalate, triisobutyl phosphate, triethylene glycol bis(2-ethylhexanoate) and bis(isopropyl)naphthalene.

Diluent

The diluent for the purpose of the present invention is an organic solvent. Examples of suitable organic solvents are naphthalenes, mineral spirits or alcohols, low molecular mass diols, such as alkylene glycols and dimethylolcyclohexane.

Wetting and Dispersing Agent

Preferable wetting and dispersing agents are salts of unsaturated polyamine amides and low-molecular acidic polyesters and mixtures thereof, for example Antiterra® U, Disperbyk®, Byk® 088 from BYK Chemie.

Filler

Fillers include the customary, familiar organic and inorganic fillers, reinforcing agents and weighting agents. Specific examples are inorganic fillers such as silicatic minerals, for example sheet-silicates such as antigorite, serpentine, hornblendes, amphibols, chrisotile, talc; metal oxides, such as kaolin, aluminium oxides, aluminium silicate, titanium oxides and iron oxides, metal salts such as chalk, barite and inorganic pigments, such as cadmium sulfide, zinc sulfide and also glass particles. Useful organic fillers include for example carbon black, melamine, expandable graphite, rosin, cyclopentadienyl resins, graft polymers, cellulose fibres, polyester fibres based on aromatic and/or aliphatic dicarboxylic esters and carbon fibres. The inorganic and organic fillers can be used individually or as mixtures.

The at least one additive can be added to component A and/or component B.

In a preferred embodiment, the at least one additive is present in the range of ≥0.1 wt. % to ≤50 wt. %, preferably in the range of ≥0.2 wt. % to ≤30 wt. % based on the total weight of the two-component composition.

The weight ratio of component (A) to component (B) is in the range of 1:20 to 3:1.

In a preferred embodiment, the presently claimed invention is directed to a two-component coating composition comprising
(I) Component A comprising
(i) ≥5 wt. % to ≤40 wt. % of one first saturated polyhydroxy compound selected from the group consisting of polyether polyol, polyester polyol, $C_2$ to $C_{32}$ alkyl polyol and sugar alcohol;
(ii) ≥1 wt. % to ≤50 wt. % of water;
(iii) ≥2 wt. % to ≤25 wt. % of at least one metal component selected from the group consisting of metal oxide, metal hydroxide, metal aluminate and metal silicate; and
(II) ≥10 wt. % to ≤90 wt. % % by weight of component B comprising at least one polyisocyanate.

In a preferred embodiment, the presently claimed invention is directed to a two-component coating composition comprising
(I) Component A comprising
(i) at least one first saturated polyhydroxy compound selected from the group consisting of polyether polyol, polyester polyol, $C_2$ to $C_{32}$ alkyl polyol and sugar alcohol;
(ii) water;
(iii) at least one metal component selected from the group consisting of metal oxide, metal hydroxide, metal aluminate and metal silicate;
(iv) at least one second saturated polyhydroxy compound selected from the group consisting of polyether polyol, polyester polyol, $C_2$ to $C_{32}$ alkyl polyol and sugar alcohol;
wherein the second polyhydroxy compound is different from the first polyhydroxy compounds; and
(II) Component B comprising at least one polyisocyanate.

In a preferred embodiment, the presently claimed invention is directed to a two-component coating composition comprising
(I) Component A comprising
(i) ≥5 wt. % to ≤40 wt. % of one first saturated polyhydroxy compound selected from the group consisting of polyether polyol, polyester polyol, $C_2$ to $C_{32}$ alkyl polyol and sugar alcohol;
(ii) ≥1 wt % to ≤50 wt. % water;
(iii) ≥2 wt. % to ≤25 wt. % by weight of at least one metal component selected from the group consisting of metal oxide, metal hydroxide, metal aluminate and metal silicate;

(iv) ≥0.2 wt. % to ≤20 wt. % of one second saturated polyhydroxy compound selected from the group consisting of polyether polyol, polyester polyol, $C_2$ to $C_{32}$ alkyl polyol and sugar alcohol;
wherein the second polyhydroxy compound is different from the first polyhydroxy compounds; and
(II) ≥10 wt. % to ≤90 wt. % of component B comprising at least one polyisocyanate.

In another preferred embodiment, the presently claimed invention is directed to a two-component coating composition comprising
(I) Component A comprising
(i) ≥5 wt. % to ≤40 wt. % by weight of one first saturated polyhydroxy compound selected from the group consisting of polyether polyol, polyester polyol, $C_2$ to $C_{32}$ alkyl polyol and sugar alcohol;
(ii) ≥5 wt. % to ≤50 wt. % water;
(iii) ≥2 wt. to ≤20 wt. % of at least one metal component selected from the group consisting of metal oxide, metal hydroxide, metal aluminate and metal silicate;
(iv) ≥0.2 wt. % to ≤20 wt. % of one second saturated polyhydroxy compound selected from the group consisting of polyether polyol, polyester polyol, $C_2$ to $C_{32}$ alkyl polyol and sugar alcohol;
wherein the second polyhydroxy compound is different from the first polyhydroxy compounds; and
(II) ≥20 wt. to ≤80 wt. % by weight of component B comprising at least one polyisocyanate.

In a preferred embodiment, the presently claimed invention is directed to a two-component coating composition comprising
(I) Component A comprising
(i) at least one first saturated polyhydroxy compound selected from the group consisting of polyether polyol and polyester polyol;
(ii) water;
(iii) at least one metal component selected from the group consisting of metal oxide, metal hydroxide, metal aluminate and metal silicate;
(iv) at least one second saturated polyhydroxy compound selected from the group consisting of $C_2$ to $C_{32}$ alkyl polyol and sugar alcohol; and
(II) Component B comprising at least one polyisocyanate.

In another preferred embodiment, the presently claimed invention is directed to a two-component coating composition comprising
(I) Component A comprising
(i) ≥5 wt. % to ≤40 wt. % by weight of one first saturated polyhydroxy compound selected from the group consisting of polyether polyol and polyester polyol;
(ii) ≥1 wt. % to ≤50 wt. % water;
(iii) ≥2 wt. to ≤25 wt. % of at least one metal component selected from the group consisting of metal oxide, metal hydroxide, metal aluminate and metal silicate;
(iv) ≥0.2 wt. % to ≤20 wt. % of one second saturated polyhydroxy compound selected from the group consisting of $C_2$ to $C_{32}$ alkyl polyol and sugar alcohol;
wherein the second polyhydroxy compound is different from the first polyhydroxy compounds; and
(II) ≥10 wt. to ≤90 wt. % by weight of component B comprising at least one polyisocyanate.

In another preferred embodiment, the presently claimed invention is directed to a two-component coating composition comprising
(I) Component A comprising
(i) ≥5 wt. % to ≤40 wt. % by weight of one first saturated polyhydroxy compound selected from the group consisting of polyether polyol, polyester polyol, $C_2$ to $C_{32}$ alkyl polyol and sugar alcohol;
(ii) ≥5 wt. % to ≤50 wt. % water;
(iii) ≥2 wt. to ≤20 wt. % of at least one metal component selected from the group consisting of metal oxide, metal hydroxide, metal aluminate and metal silicate;
(iv) ≥0.2 wt. % to ≤20 wt. % of one second saturated polyhydroxy compound selected from the group consisting of polyether polyol, polyester polyol, $C_2$ to $C_{32}$ alkyl polyol and sugar alcohol;
wherein the second polyhydroxy compound is different from the first polyhydroxy compounds; and
(II) ≥20 wt. to ≤80 wt. % by weight of component B comprising at least one polyisocyanate.

In a preferred embodiment, the presently claimed invention is directed to a two-component coating composition comprising
(I) Component A comprising
(i) ≥5 wt. % to ≤40 wt. % of one first saturated polyhydroxy compound selected from the group consisting of polyether polyol and polyester polyol;
(ii) ≥5 wt. % to ≤50 wt. % water;
(iii) ≥2 wt. % to ≤20 wt. % of at least one metal component selected from the group consisting of metal oxide, metal hydroxide, metal aluminate and metal silicate;
(iv) ≥0.2 wt. % to ≤20 wt. % of one second saturated polyhydroxy compound selected from the group consisting of $C_2$ to $C_{32}$ alkyl polyol and sugar alcohol;
wherein the second polyhydroxy compound is different from the first polyhydroxy compounds; and
(II) ≥20 wt. % to ≤80 wt. % of component B comprising at least one polyisocyanate.

In a preferred embodiment, the presently claimed invention is directed to a two-component coating composition comprising
(I) Component A comprising
(i) at least one first saturated polyhydroxy compound selected from the group consisting of polyether polyol and polyester polyol;
(ii) water;
(iii) at least one metal component selected from the group consisting of metal oxide, metal hydroxide, metal aluminate and metal silicate;
(iv) at least one second saturated polyhydroxy compound selected from the group consisting of $C_2$ to $C_6$ alkyl polyol and sugar alcohol; and
(II) Component B comprising at least one polyisocyanate.

In another preferred embodiment, the presently claimed invention is directed to a two-component coating composition comprising
(I) Component A comprising
(i) ≥5 wt. % to ≤40 wt. % by weight of one first saturated polyhydroxy compound selected from the group consisting of polyether polyol and polyester polyol;
(ii) ≥1 wt. % to ≤50 wt. % water;
(iii) ≥2 wt. to ≤25 wt. % of at least one metal component selected from the group consisting of metal oxide, metal hydroxide, metal aluminate and metal silicate;
(iv) ≥0.2 wt. % to ≤20 wt. % of one second saturated polyhydroxy compound selected from the group consisting of $C_2$ to $C_6$ alkyl polyol and sugar alcohol;
and
(II) ≥10 wt. to 90 wt. % by weight of component B comprising at least one polyisocyanate.

In another preferred embodiment, the presently claimed invention is directed to a two-component coating composition comprising
- (I) Component A comprising
  - (i) ≥5 wt. % to ≤40 wt. % by weight of one first saturated polyhydroxy compound selected from the group consisting of polyether polyol and polyester polyol;
  - (ii) ≥5 wt. % to ≤50 wt. % water;
  - (iii) ≥2 wt. to ≤20 wt. % of at least one metal component selected from the group consisting of metal oxide, metal hydroxide, metal aluminate and metal silicate;
  - (iv) ≥0.2 wt. % to ≤20 wt. % of one second saturated polyhydroxy compound selected from the group consisting of $C_2$ to $C_6$ alkyl polyol and sugar alcohol; and
- (II) ≥20 wt. to ≤80 wt. % by weight of component B comprising at least one polyisocyanate.

In a preferred embodiment, the presently claimed invention is directed to a two-component coating composition comprising
- (I) Component A comprising
  - (i) ≥5 wt. % to ≤40 wt. % of one first saturated polyhydroxy compound selected from the group consisting of polyether polyol and polyester polyol;
  - (ii) ≥5 wt. % to ≤50 wt. % water;
  - (iii) ≥2 wt. % to ≤20 wt. % of at least one metal component selected from the group consisting of metal oxide, metal hydroxide, metal aluminate and metal silicate;
  - (iv) ≥0.2 wt. % to ≤20 wt. % of one second saturated polyhydroxy compound selected from the group consisting of $C_2$ to $C_6$ alkyl polyol and sugar alcohol; and
- (II) ≥20 wt. % to ≤70 wt. % of component B comprising at least one polyisocyanate.

The preferred embodiments as described above also apply to the uses and methods as outlined in the following passages.

In another aspect, the present invention is directed to a method of preparing the two-component composition, comprising
  a) preparing component (A) by mixing the one first saturated polyhydroxy compound, optionally the one second saturated polyhydroxy compound, water, the at least one metal component selected from the group consisting of metal oxide, metal hydroxide, metal aluminate and metal silicate;
  and
  b) adding the polyisocyanate component (B) to the mixture of component (A) and mixing, to obtain a coating composition.

Optionally, step (a) and/or step (b) may be subjected to heating at a temperature in the range of ≥50° C. to ≤100° C.

The term "mixing" refers to mechanical agitation of the components carried out in a vessel, not necessarily a reactor. Agitation means provide sufficient mixing to the components, which leads to better heat and mass distribution.

The mixing is preferably vigorous mixing effected at a rotational speed in the range of ≥100 to ≤1000 rpm.

In an embodiment, step a) and/or step b) of the method of preparing the two-component composition as described hereinabove, independently of one another, optionally take place in the presence of at least one catalyst and/or at least one additive.

In another aspect, the present invention is directed to a method for coating a surface by applying a two-component composition comprising
- (I) Component A comprising
  - (i) ≥5 wt. % to ≤40 wt. % by weight of one first saturated polyhydroxy compound selected from the group consisting of polyether polyol, polyester polyol, $C_2$ to $C_{32}$ alkyl polyol and sugar alcohol;
  - (ii) ≥1 wt. % to ≤50 wt. % water;
  - (iii) ≥2 wt. % to ≤25 wt. % of at least one metal component selected from the group consisting of metal oxide, metal hydroxide, metal aluminate and metal silicate;
- (II) ≥10 wt. % to ≤90 wt. % of component B comprising at least one polyisocyanate. wherein the coating has a tensile strength of at least 1.5 MPa determined according to ASTM D 638 method.

In an embodiment, the present invention is directed to a method for coating a surface by applying a two-component composition comprising
- (I) Component A comprising
  - (i) ≥5 wt. % to ≤40 wt. % of one first saturated polyhydroxy compound selected from the group consisting of polyether polyol, polyester polyol, $C_2$ to $C_{32}$ alkyl polyol and sugar alcohol;
  - (ii) ≥1 wt. % to ≤50 wt. % water;
  - (iii) ≥2 wt. % to ≤25 wt. % of at least one metal component selected from the group consisting of metal oxide, metal hydroxide, metal aluminate and metal silicate;
  - (iv) ≥0.2 wt. % to ≤20 wt. % of one second saturated polyhydroxy compound selected from the group consisting of polyether polyol, polyester polyol $C_2$ to $C_{32}$ alkyl polyol and sugar alcohol;
wherein the second polyhydroxy compound is different from the first polyhydroxy compound; and
- (II) ≥10 wt. % to ≤90 wt. % of component B comprising at least one polyisocyanate.
wherein the coating has a tensile strength of at least 1.5 MPa determined according to ASTM D 638 method.

In an embodiment, the present invention is directed to a method for coating a surface by applying a two-component composition comprising
- (I) Component A comprising
  - (i) ≥5 wt. % to ≤40 wt. % of one first saturated polyhydroxy compound selected from the group consisting of polyether polyol and polyester polyol;
  - (ii) ≥1 wt. % to ≤50 wt. % water;
  - (iii) ≥2 wt. % to ≤25 wt. % of at least one metal component selected from the group consisting of metal oxide, metal hydroxide, metal aluminate and metal silicate;
  - (iv) ≥0.2 wt. % to ≤20 wt. % of one second saturated polyhydroxy compound selected from the group consisting of $C_2$ to $C_{32}$ alkyl polyol and sugar alcohol;
- (II) ≥10 wt. % to ≤90 wt. % of component B comprising at least one polyisocyanate.
wherein the coating has a tensile strength of at least 1.5 MPa determined according to ASTM D 638 method.

In an embodiment, the present invention is directed to a method for coating a surface by applying a two-component composition comprising
- (I) Component A comprising
  - (i) ≥5 wt. % to ≤40 wt. % of one first saturated polyhydroxy compound selected from the group consisting of polyether polyol and polyester polyol;

(ii) ≥1 wt. % to ≤50 wt. % water;
(iii) ≥2 wt. % to ≤25 wt. % of at least one metal component selected from the group consisting of metal oxide, metal hydroxide, metal aluminate and metal silicate;
(iv) ≥0.2 wt. % to ≤20 wt. % of one second saturated polyhydroxy compound selected from the group consisting of $C_2$ to $C_6$ alkyl polyol and sugar alcohol;
(II) ≥10 wt. % to ≤80 wt. % of component B comprising at least one polyisocyanate.
wherein the coating has a tensile strength of at least 1.5 MPa determined according to ASTM D 638 method.

In an embodiment, the method described hereinabove, optionally takes place in the presence of at least one catalyst and/or at least one additive.

In another aspect, the presently claimed invention is directed to a method for coating a surface. The method comprises
a) preparing component (A) by mixing one first saturated polyhydroxy compound, optionally one second saturated polyhydroxy compound, water and at least one metal component selected from the group consisting of metal oxide, metal hydroxide, metal aluminate and metal silicate;
b) adding at least one polyisocyanate component (B) to the mixture of component (A) and mixing, to obtain a mixed material,
c) applying the mixed material to a surface,
d) optionally smoothing the applied mixed material, and
e) curing the applied mixed material,
to obtain the polyurethane flooring or coating.

In context to the present invention "curing" refers to the chemical reaction between component A and component B resulting in the formation of a hardened coat.

The Shore hardness of the two-component composition is measured according to ASTM D2240 on a Durometer D scale. The test measures the resistance of the material toward indentation.

In a preferred embodiment, the shore hardness (Shore D) of the two-component composition is in the range of ≥40 to ≤90.

The tensile strength of the two-component composition is measured according to ASTM D 638.

In a preferred embodiment, the two-component composition has a tensile strength in the range of ≥4 N/mm² to ≤30 N/mm².

Preferably, the two-component composition finds use in the construction industry.

The component part to be repaired or refurbished and the substrate on which the component part is to be constructed, e.g. as a coating, flooring or lining, may be of any material, for instance concrete, mortar, metal, such as steel or copper, stones, bricks, masonry, coatings, composite material or plastic.

In another embodiment, the presently claimed invention is directed to a method for coating a surface whereby the surface is selected from concrete, mortar, metal, stones, bricks, masonry, coatings, composite material or plastic, comprising at least the step of applying a composition comprising
a) preparing component (A) by mixing one first polyhydroxy compound, optionally one second polyhydroxy compound, water and at least one metal component selected from the group consisting of metal oxide, metal hydroxide, metal aluminate and metal silicate;
b) adding at least one polyisocyanate component (B) to the mixture of component (A) and mixing, to obtain a mixed material,
c) applying the mixed material to a surface,
d) optionally smoothing the applied mixed material, and
e) curing the applied mixed material,
to obtain the polyurethane flooring or coating.

In another embodiment, the presently claimed invention is directed to a method for coating a surface whereby the surface is selected from concrete, mortar, metal, stones, bricks, masonry, coatings, composite material or plastic, comprising at least the step of applying a composition comprising
a) preparing component (A) by mixing one first polyhydroxy compound, one second polyhydroxy compound, water and at least one metal component selected from the group consisting of metal oxide, metal hydroxide, metal aluminate and metal silicate;
b) adding at least one polyisocyanate component (B) to the mixture of component (A) and mixing, to obtain a mixed material,
c) applying the mixed material to a surface,
d) optionally smoothing the applied mixed material, and
e) curing the applied mixed material,
to obtain the polyurethane flooring or coating.

In an embodiment, step a) and/or step b) of the method for coating the surface as described hereinabove, independently of one another, optionally takes place in the presence of at least one catalyst and/or at least one additive.

The composition used according to the present invention is a two-component composition. The two components are stored separately to avoid spontaneous reaction. The components may be assembled together as a package. For use, the components are mixed together, hydration and curing reactions begin so that the composition is to be processed within the open time after mixing the components. Optionally, one or more additional components may be included for specific purposes. For instance, an additional component comprising colouring agents such as pigments may be used for colouring purposes.

Advantages

The embodiment of the two-component coating composition can offer one or more of the following advantages:
1. Provide chemical resistance to the surfaces to which it is applied.
2. Provide water-proofing to the surfaces to which it is applied.
3. The composition is free from NH-reactive groups.
4. The composition offers good mechanical properties.
5. The benefits associated with the addition of water can be realized in a simple two-component system that is both storage stable and maintains the beneficial physical and chemical properties associated with the three-component materials.

In the following, specific embodiments of the present invention are described:
1. A two-component coating composition comprising
(I) Component A comprising
(i) one first saturated polyhydroxy compound selected from the group consisting of polyether polyol, polyester polyol, $C_2$ to $C_{32}$ alkyl polyol and sugar alcohol;
(ii) ≥1 wt. % to ≤50 wt. % of water, based on the total weight of the two-component composition; and
(iii) ≥2 wt. % to ≤50 wt. % of at least one metal component selected from the group consisting of metal oxide, metal hydroxide, metal aluminate and metal silicate, by weight of the total weight of the two-component composition; and (II) Component B comprising at least one polyisocyanate.

2. The two-component composition according to embodiment 1, wherein the one first saturated polyhydroxy compound is selected from the group consisting of polyethylene glycol, polypropylene glycol, polypropyleneoxide diol and polypropyleneoxide triol.

3. The two-component composition according to embodiment 1 or 2, wherein the amount of the one first saturated polyhydroxy compound is in the range of ≥5.0 wt. % to ≤40 wt. %, based on the total weight of the two-component composition.

4. The two-component composition according to one or more of embodiments 1 to 3, wherein the one first saturated polyhydroxy compound has a weight average molecular weight Mw in the range of ≥50 to ≤20,000 g/mol determined according to DIN 55672-1.

5. The two-component composition according to embodiment 1, wherein component A further comprises (iv) one second saturated polyhydroxy compound selected from the group consisting of polyether polyol, polyester polyol, $C_2$ to $C_{32}$ alkyl polyol and sugar alcohol, which is different from the one first saturated polyhydroxy compound.

6. The two-component composition according to embodiment 5, wherein the one second saturated polyhydroxy compound is selected from the group consisting of $C_2$ to $C_{32}$ alkyl polyol and sugar alcohol.

7. The two-component composition according to embodiment 5 or 6, wherein the amount of the one second saturated polyhydroxy compound, is in the range of ≥0.2 wt. % to ≤20 wt. %, based on the total weight of the two-component composition.

8. The two-component composition according to embodiment 1, wherein the at least one metal component is selected from the group consisting of metal oxide and metal hydroxide.

9. The two-component composition according to embodiment 8, wherein the metal oxide and/or metal hydroxide is alkaline earth metal oxide and/or alkaline earth metal hydroxide.

10. The two-component composition according to one or more of embodiments 1 or 8, wherein the at least one metal oxide and/or at least one metal hydroxide is selected from the group consisting of magnesium oxide, magnesium hydroxide, calcium oxide and calcium hydroxide.

11. The two-component composition according to one or more of embodiments 1 to 10, wherein the amount of the at least one metal oxide and/or the at least one metal hydroxide is in the range of ≥2 wt. % to ≤25 wt. % based on the total weight of the two-component composition.

12. The two-component composition according to embodiment 1, wherein the at least one polyisocyanate is a liquid oligomer or prepolymer.

13. The two-component composition according to embodiment 1, wherein the at least one polyisocyanate is selected from the group consisting of pentamethylene diisocyanate, hexamethylene diisocyanate, Isophorone diisocyanate, 2,2,4- and 2,4,4-trimethyl-1,6-hexamethylene diisocyanate, tetramethoxybutane 1,4-diisocyanate, butane-1,4-diisocyanate, dicyclohexylmethane diisocyanate, cyclohexane 1,3- and 1,4-diisocyanate, 1,12-dodecamethylene diisocyanate, diisocyanates of dimeric fatty acids; lysine methyl ester diisocyanate, 1-isocyanato-3,3,5-trimethyl-5-isocyanatomethylcyclohexane, hydrogenated diphenylmethane diisocyanate, hydrogenated 2,4-tolylene diisocyanate, hydrogenated 2,6-tolylene diisocyanate, methylene diphenyl diisocyanate, toluene diisocyanate, naphthalene diisocyanate, polymeric methylene diphenyl diisocyanate, carbodiimide-modified methylene diphenyl diisocyanate.

14. The two-component composition according to one or more of embodiments 1 to 13 wherein the amount of the at least one polyisocyanate is in the range of ≥10 wt. % to ≤90 wt. % based on the total weight of the two-component composition.

15. The two-component composition according to embodiment 1, further comprising at least one catalyst selected from the group consisting of amine catalyst, alkanolamine catalyst and metal catalyst.

16. The two-component composition according to embodiment 15, wherein the amine catalyst is a tertiary aliphatic amine catalyst.

17. The two-component composition according to embodiment 16, wherein the tertiary aliphatic amine catalyst is morpholino based.

18. The two-component composition according to embodiment 17, wherein the tertiary aliphatic amine catalyst is 2,2'-dimorpholinodiethyl ether.

19. The two-component composition according to embodiment 15, wherein the metal catalyst is selected from the group consisting of tin, bismuth, potassium, lithium, titanium, zirconium, zinc catalyst and mixture thereof.

20. The two-component composition according to embodiment 15, wherein the metal catalyst is selected from the group consisting of dibutyltin dilaurate, stannous octoate, bismuth-neodecanoate and zinc-neodecanoate.

21. The two-component composition according to embodiment 15, wherein the amount of the catalyst is in the range of ≥0.05 wt. % to ≤5.0 wt. %, based on the total weight of the two-component composition.

22. The two-component composition according to one or more of embodiments 1 to 21 further comprising at least one additive.

23. The two-component composition according to one or more of embodiments 1 to 22 wherein the at least one additive is added to component A and/or component B.

24. The two-component composition according to one or more of embodiments 22 or 23, wherein the at least one additive is selected from the group consisting of emulsifying agents, flame retardants, antimicrobial agents, pigments, UV light stabilizers, plasticizers, diluents, organic and inorganic fillers.

25. A method of preparing the two-component composition according to one or more of embodiments 1 to 24, comprising
(a) preparing component (A) by mixing the components (i), (ii) and (iii);
(b) adding component (B) to the mixture of step (a) and mix to get a final coating composition.

26. A two-component coating composition according to embodiment 1 comprising
(I) Component A comprising
(i) at least one first saturated polyhydroxy compound selected from the group consisting of polyether polyol and polyester polyol;
(ii) ≥1 wt. % to ≤50 wt. % of water, based on the total weight of the two-component composition;
(iii) ≥2 wt. % to ≤25 wt. % of at least one metal component selected from the group consisting of metal oxide, metal hydroxide, metal aluminate and metal silicate; based on the total weight of the two-component composition; and (iv) at least one second saturated polyhydroxy compound selected from the group consisting of $C_2$ to $C_6$ alkyl polyol and sugar alcohol;

(II) Component B comprising at least one polyisocyanate.

27. A method of preparing the two-component composition according to embodiment 26, comprising the steps of:

(a) preparing component (A) by mixing the components (i), (ii), (iii) and (iv);

(b) adding component (B) to the mixture of step (a) and mixing to obtain a final coating composition.

28. A process for coating a surface comprising a) providing a two-component coating composition according to one or more of embodiments 1 to 26;

b) applying the coating composition of step a) on a surface to obtain a coating; wherein the coating has a tensile strength of at least 1.5 MPa determined according to ASTM D 638 method.

29. A two-component composition according to one or more of embodiments 1 to 28, is free from NH-reactive groups.

EXAMPLES

Compounds

Bayferrox® red is available from Lanxess, Germany.

Arcol® polyol 1104 (low VOC medium molecular weight polypropylenoxide triol, hydroxyl number 53.5-57.5 mg KOH/g)

Desmodur® N3600 (polyfunctional aliphatic polyisocyanate resin based on hexamethylene diisocyanate)

are available from Covestro.

Byk® 088 (additive)

Disperbyk® 190 (wetting and dispersing additive)

Antiterra® U (wetting and dispersing additive)

are available form BYK-Chemie GmbH.

Lupranat® M10R (diphenylmethane-4,4'-diisocyanate oligomer, with average functionality of 2.6)

Lupranat® M70R (diphenylmethane-4,4'-diisocyanate oligomer, with average functionality of 2.9)

Cycloquart® HS (stabilizer)

are available from BASF SE.

Plasticizer WVC3800 is available from Celanese.

Barite 15 extra (barium sulfate) is available from Sibelco Specialty Minerals Europe.

Tolonate™ X FLO (aliphatic isocyanate polymer) is available from Vencorex.

Methods

Shore Hardness (D)

The Shore hardness was measured according to ASTM D2240 on a Durometer D scale. The test measures the resistance of the material toward indentation.

Tensile Strength

The tensile strength was measured according to ASTM D 638 method.

Weathering Test

The accelerated weathering was determined by QUV accelerated weathering test. Coated and uncoated samples of 150×75×10 mm and 75×35×10 mm were artificially weathered in a QUV chamber (Q-Lab Corporation) with UVA radiation (0.45 W/m² at 313 nm) and condensation cycles for 1000 h following the artificial weathering conditions defined in ISO 16474-3 method. Changes to the coatings were assessed by measuring colour, gloss, water-repellency and roughness.

Example 1

Calcium hydroxide (105 g) and bayferrox red (15 g) were dispersed with vigorous stirring in a mixture of Arcol® Polyol 1104 (55 g), glycerol (50 g), Byk88 (5 g) and Disperbyk 190 (20 g). After preparing the dispersion, water (50 g) was added under stirring to obtain component A (330 g). Lupranat M10R (141 g), Lupranat M70R (222 g), castor oil (56 g) and Arcol® Polyol 1104 (171 g) were mixed, slowly heated to 60° C. and kept at this temperature until the NCO-value was 16.06%. Plasticizer WVC3800 (110 g) was added under stirring to obtain component B (670 g).

For curing, component A (300 g) and component B (700 g) were mixed together and stirred at 300 rpm. A 1 mm film was applied by a toothed trowel and entrained air was removed with a spike roller. Pot life was about 15 minutes and tack free time was about 18 h.

After 7 days at 23° C. and 50% relative humidity, a glossy film with 38% elongation, shore hardness (Shore D) of 60 and a tensile strength of 16 N/mm² was obtained.

Example 2

Calcium hydroxide (110 g) and Barite 15 extra (300 g) were dispersed with vigorous stirring in a mixture of Arcol® Polyol 1104 (460 g), glycerol (26 g), cycloquart HS (4 g), Disperbyk 199 (27 g) and Antiterra U (18 g). After preparing the dispersion, water (55 g) was added under stirring to obtain component A (1000 g).

Desmodur N3600 (490 g), Tolonate X FLO (490 g), Byk 088 (19 g) and dibutyltin dilaurate (1 g) were mixed to get obtain component B (1000 g).

For curing, component A (200 g) and component B (200 g) were mixed together and stirred at 300 rpm. A 1 mm film was applied by a toothed trowel and entrained air was removed with a spike roller.

After 7 days at 23° C. and 50% relative humidity, a film with 45% elongation, shore hardness (Shore D) of 60 and 6 N/mm² tensile strength was obtained.

The composition was light stable as determined by measuring QUV for 1000 hours.

The invention claimed is:

1. A two-component coating composition that is suitable for forming a coating on a surface by applying a mixed coating composition to the surface and curing the mixed coating composition, the two-component coating composition comprising (I) Component A comprising (i) ≥5.0 wt. % to ≤40 wt. % of one first saturated polyhydroxy compound selected from the group consisting of polyether polyol, polyester polyol, $C_2$ to $C_{32}$ alkyl polyol and sugar alcohol, based on the total weight of the two-component composition;

(ii) ≥2.75 wt. % to ≤50 wt. % of water, based on the total weight of the two-component composition;

(iii) ≥2 wt. % to ≤50 wt. % of at least one metal component selected from the group consisting of calcium oxide and calcium hydroxide, based on the total weight of the two-component composition; and (iv) ≥0.2 wt. % to ≤20 wt. % of one second saturated polyhydroxy compound selected from the group consisting of $C_2$ to $C_6$ alkyl polyol, which is different from the first saturated polyhydroxy compound, based on the total weight of the two-component composition; and (II) Component B comprising at least one polyisocyanate.

2. The two-component composition according to claim 1, wherein the one first saturated polyhydroxy compound is selected from the group consisting of polyethylene glycol, polypropylene glycol, polypropylenoxide diol and polypropylenoxide triol.

3. The two-component composition according to claim 1, wherein the one first saturated polyhydroxy compound has a weight average molecular weight Mw in the range of ≥100 to ≤20,000 g/mol determined according to DIN 55672-1.

4. The two-component composition according to claim 1, wherein the one second saturated polyhydroxy compound has a weight average molecular weight Mw in the range of ≥50 to ≤2,000 g/mol determined according to DIN 55672-1.

5. The two-component composition according to claim 1, wherein the at least one polyisocyanate is a liquid oligomer or a prepolymer.

6. The two-component composition according to claim 1, wherein the at least one polyisocyanate is selected from the group consisting of pentamethylene diisocyanate, hexamethylene diisocyanate, isophorone diisocyanate, 2,2,4-and 2,4,4-trimethyl-1,6-hexamethylene diisocyanate, butane-1,4-diisocyanate, dicyclohexylmethane diisocyanate, methylcyclohexane diisocyanate, cyclohexane 1,3- and 1,4-diisocyanate, 1,12-dodecamethylene diisocyanate, diisocyanates of dimeric fatty acids; lysine methyl ester diisocyanate, 1-isocyanato-3,3,5-trimethyl-5-isocyanatomethylcyclohexane, hydrogenated diphenylmethane diisocyanate, hydrogenated 2,4-tolylene diisocyanate, hydrogenated 2,6-tolylene diisocyanate, methylene diphenyl diisocyanate, toluene diisocyanate, naphthalene diisocyanate, polymeric methylene diphenyl diisocyanate, and carbodiimide-modified methylene diphenyl diisocyanate.

7. The two-component composition according to claim 1, wherein the amount of the at least one polyisocyanate is in the range of ≥10 wt. % to ≤90 wt. % based on the total weight of the two-component composition.

8. The two-component composition according to claim 1, further comprising one catalyst selected from the group consisting of amine catalyst, alkanolamine catalyst and metal catalyst.

9. The two-component composition according to claim 8, wherein the amine catalyst is a tertiary aliphatic amine catalyst.

10. The two-component composition according to claim 8, wherein the metal catalyst is selected from the group consisting of dibutyltin dilaurate, stannous octoate, bismuth neodecanoate and zinc neodecanoate.

11. The two-component composition according to claim 8, wherein the amount of the catalyst is in the range of ≥0.05 wt. % to ≤5 wt. %, based on the total weight of the two-component composition.

12. The two-component composition according to claim 1, further comprising at least one additive.

13. The two-component composition according to claim 12, wherein the at least one additive is selected from the group consisting of emulsifying agents, flame retardants, antimicrobial agents, pigments, UV light stabilizers, plasticizers, diluents, organic and inorganic fillers.

14. A method of preparing a mixed coating composition from the two-component composition according to claim 1, comprising the steps of:

(a) preparing component (A) by mixing together (i) the one first saturated polyhydroxy compound, (ii) the water, (iii) the at least one metal component, and (iv) the one second saturated polyhydroxy compound; and (b) adding the component (B) to the mixture of step (a) and mixing to obtain the mixed coating composition.

15. The two-component composition according to claim 2, wherein the one first saturated poly hydroxy compound has a weight average molecular weight Mw in the range of ≥100 to ≤20,000 g/mol determined according to DIN 55672-1.

16. The two-component composition according to claim 1, comprising from ≥5.5 wt. % to ≤50 wt. % of the at least one metal component, based on the total weight of the two-component composition.

* * * * *